US012732484B2

(12) United States Patent
Ji et al.

(10) Patent No.: US 12,732,484 B2
(45) Date of Patent: Sep. 8, 2026

(54) AUTOMATED FUZZY HASH BASED SIGNATURE COLLECTING SYSTEM FOR MALWARE DETECTION

(71) Applicant: Palo Alto Networks, Inc., Santa Clara, CA (US)

(72) Inventors: Yang Ji, San Jose, CA (US); Wenjun Hu, Santa Clara, CA (US); Xiao Zhang, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/807,767

(22) Filed: Aug. 16, 2024

(65) Prior Publication Data

US 2024/0414129 A1 Dec. 12, 2024

Related U.S. Application Data

(63) Continuation of application No. 17/472,485, filed on Sep. 10, 2021, now Pat. No. 12,107,831.

(51) Int. Cl.
*H04L 9/40* (2022.01)

(52) U.S. Cl.
CPC ...... *H04L 63/0263* (2013.01); *H04L 63/1416* (2013.01); *H04L 63/1425* (2013.01)

(58) Field of Classification Search
None
See application file for complete search history.

(56) References Cited

U.S. PATENT DOCUMENTS 9,516,055 B1 12/2016 Liu
10,432,648 B1 10/2019 Xu
10,764,309 B2 9/2020 Wang
11,182,481 B1 * 11/2021 Oliver .................... G06N 20/00
11,349,865 B1 5/2022 Satpathy
12,107,831 B2 * 10/2024 Ji ........................ H04L 63/1425
2015/0067839 A1 3/2015 Wardman
2017/0251003 A1 8/2017 Rostami-Hesarsorkh
2019/0228151 A1 7/2019 Schmugar
2019/0238565 A1 * 8/2019 Wang ................... G06F 21/566
2019/0238566 A1 8/2019 Wang
2019/0364062 A1 * 11/2019 Xu ......................... G06N 20/00
2020/0226214 A1 * 7/2020 Reddekopp ......... G06F 16/1734
2020/0252428 A1 8/2020 Gardezi
2021/0021612 A1 1/2021 Higbee
2022/0400125 A1 * 12/2022 Mendelowitz ........... G06N 3/08

OTHER PUBLICATIONS

Bass et al., Results of SEI Line-Funded Exploratory New Starts Projects (Year: 2012).

(Continued)

*Primary Examiner* — Nicholas P Celani
(74) *Attorney, Agent, or Firm* — Van Pelt, Yi & James LLP

(57) ABSTRACT

Automated fuzzy hash based signature collection is disclosed. A set of candidate fuzzy hashes corresponding to a set of false negative samples is received. A false positive reduction analysis is performed on the received set of candidate fuzzy hashes to generate a reduced set of fuzzy hashes. At least a portion of the reduced set of fuzzy hashes is clustered into a fuzzy hash cluster. A signature for a family of malware is generated based at least in part on the fuzzy hash cluster.

20 Claims, 7 Drawing Sheets

(56) References Cited

OTHER PUBLICATIONS

Namanya et al., Detection of Malicious Portable Executables Using Evidence Combinational Theory with Fuzzy Hashing. 2016 IEEE 4th International Conference on Future Internet of Things and Cloud, 2016, pp. 91-98.

Shiel et al., Improving File-Level Fuzzy Hashes for Malware Variant Classification, Digital Investigation 28, 2019, pp. S88-S94.

* cited by examiner

AUTOMATED FUZZY HASH BASED SIGNATURE COLLECTING SYSTEM FOR MALWARE DETECTION

CROSS REFERENCE TO OTHER APPLICATIONS

This application is a continuation of U.S. patent application Ser. No. 17/472,485 entitled AUTOMATED FUZZY HASH BASED SIGNATURE COLLECTING SYSTEM FOR MALWARE DETECTION filed Sep. 10, 2021 which is incorporated herein by reference for all purposes.

BACKGROUND OF THE INVENTION

Malware is a general term commonly used to refer to malicious software (e.g., including a variety of hostile, intrusive, and/or otherwise unwanted software). Example uses of malware include disrupting computer and/or computer network operations, stealing proprietary information (e.g., confidential information, such as identity, financial, and/or intellectual property related information), and/or gaining access to private/proprietary computer systems and/or computer networks. Malware can be in the form of code, scripts, active content, and/or other software. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

DETAILED DESCRIPTION

Figure 1:
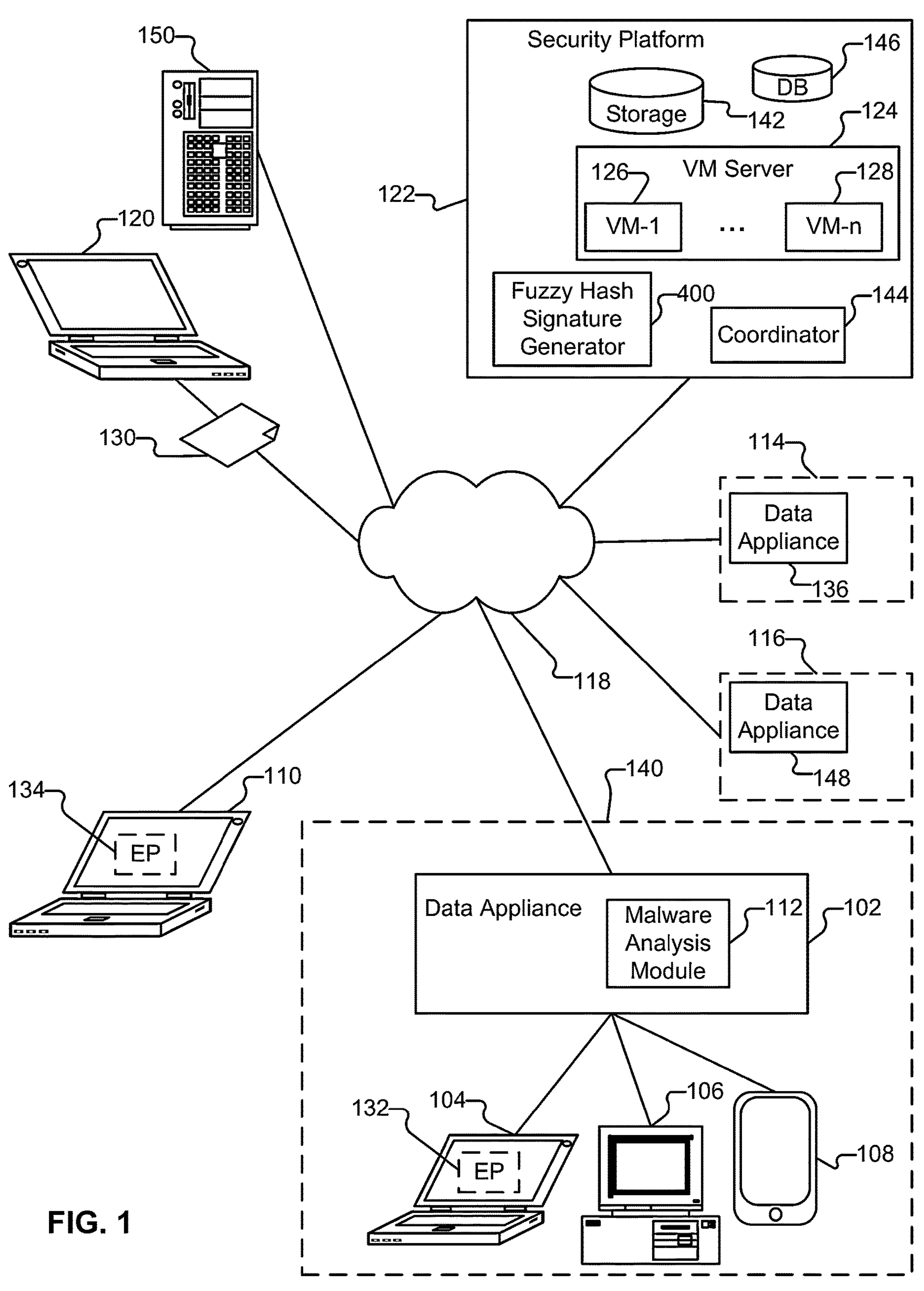
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious applications ("malware") are detected and prevented from causing harm. As will be described in more detail below, malware classifications (e.g., as determined by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Although illustrated as a single element in FIG. 1, enterprise network 140 can comprise multiple networks, any/each of which can include one or multiple data appliances or other components that embody techniques described herein. For example, the techniques described herein can be deployed by large, multi-national companies (or other entities) with multiple offices in multiple geographical locations. And, while client devices 104-108 are illustrated in FIG. 1 as connecting directly to data appliance 102, it is to be understood that one or more intermediate nodes (e.g., routers, switches, and/or proxies) can be and typically are interposed between various elements in enterprise network 140.

Figure 2A:
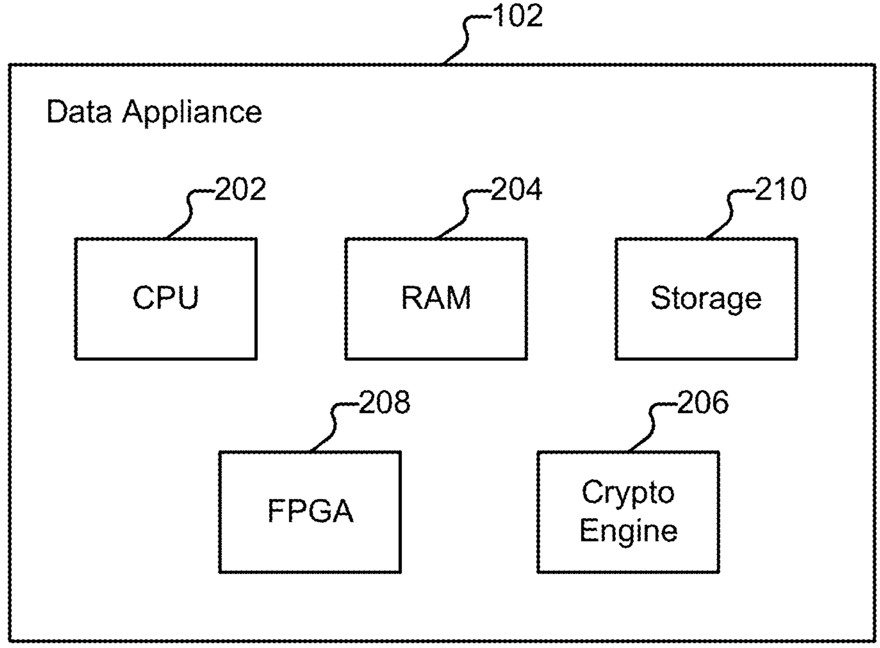
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device (e.g., endpoint protection application 132).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
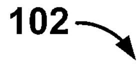
FIG. 2B is a functional diagram of logical components of an embodiment of a data appliance.
Figure 2B:
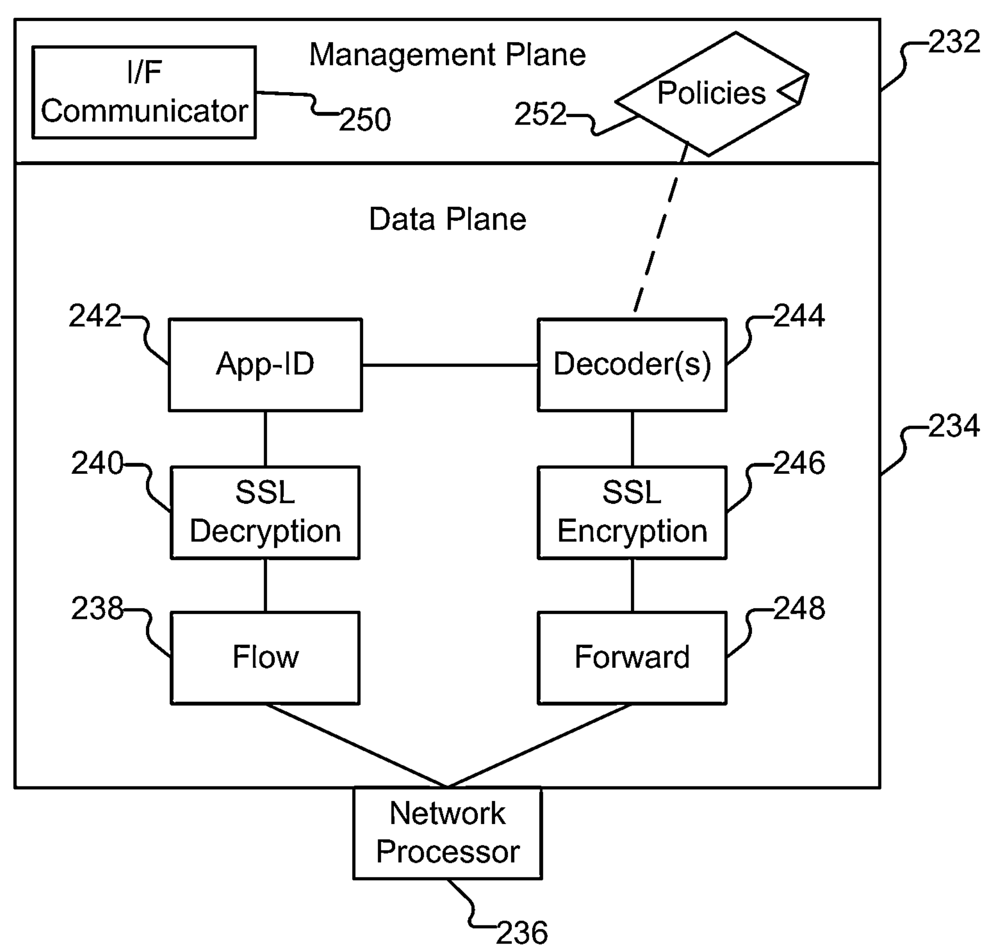

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders 244.

Based on the determination made by application identification engine 242, the packets are sent to an appropriate decoder 244. Decoder 244 is configured to assemble packets (which may be received out of order) into the correct order, perform tokenization, and extract out information. Decoder 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Security Platform

Returning to FIG. 1, in various embodiments, security platform 122 is configured to provide a variety of services (including to data appliance 102), including analyzing samples (e.g., of documents, applications, etc.) for maliciousness, categorizing applications, categorizing domains/URLs/URIs, etc.

Suppose a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 (e.g., an MD5 hash of malware 130) is included in the set of signatures, data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). Security platform 122 can also provide other types of information to data appliance 102 (e.g., as part of a subscription) such as a set of machine learning models usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A potential drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A potential drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. As will be described in more detail below, an alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs open source and/or commercially available virtualization software, such as Linux Kernel based Virtual Machine (KVM), VMware ESXi, Citrix XenServer, and/or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available the results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)). Platform 122 can also make available other types of information, such as machine learning models that can help data appliance 102 detect malware (e.g., through techniques other than hash-based signature matching).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install endpoint protection software 134 on client device 110 that communicates with security platform 122 (e.g., to receive content packages from security platform 122, use the received content packages to check attachments in accordance with techniques described herein, and transmit applications to security platform 122 for analysis).

In various embodiments, security platform 122 is configured to collaborate with one or more third party services. As one example, security platform 122 can provide malware scanning results (and other information, as applicable) to a third-party scanner service (e.g., VirusTotal). Security platform 122 can similarly incorporate information obtained from a third-party scanner service (e.g., maliciousness verdicts from entities other than security platform 122) into its own information (e.g., information stored in database 146 or another appropriate repository of information).

IV. Analyzing Samples Using Static/Dynamic Analysis

Figure 3:
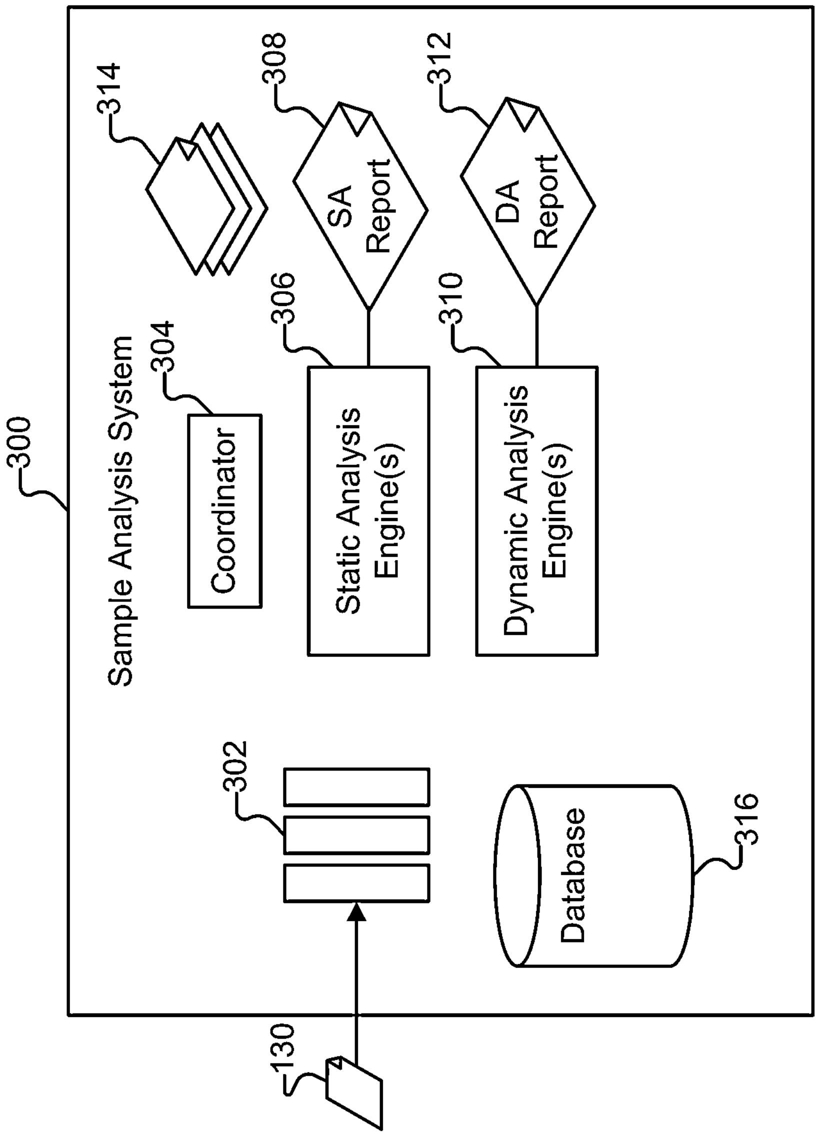
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine (implementable via a set of scripts authored in an appropriate scripting language) obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. During the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is suspicious or malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. Automated Fuzzy Hash Based Signature Collection

As mentioned above, malicious individuals continually look for new ways to prevent security infrastructure from detecting the malicious nature of their malware. One frequently used approach is for a malware author to make versions of a given piece of malware (often with subtle differences), so that while a first signature (e.g., stored in database 146 and usable by data appliance 102) might successfully flag a first piece of malware as malicious, the same signature will not match a new variant of the malware and the new malware variant will go undetected (e.g., by data appliance 102). One way of combating this technique is for security platform 122 to use a fuzzy hashing scheme. An example of a fuzzy hashing scheme is "ssdeep," which can efficiently compute context triggered piecewise hashes (CTPH), also referred to as fuzzy hashes. Fuzzy hashes can be used to detect new instances of malware that are similar to, but not necessarily identical to, known malware. As malware authors continue to revise/release variants of their malware, fuzzy hashes can be very useful in identifying/mitigating the potential harm such new malware can pose. Unfortunately, fuzzy hashes have drawbacks. In particular, they can result in both false positives (where benign samples are erroneously flagged as malicious) and false negatives (where malicious samples are erroneously classified as benign). In various embodiments, one task performed by security platform 122 is malware signature generation. And, as will be described in more detail below, in various embodiments, security platform 122 includes an automated fuzzy hash signature generator 400 that can efficiently and automatically generate fuzzy hash based signatures that minimize both false positives and false negatives.

Figure 4:
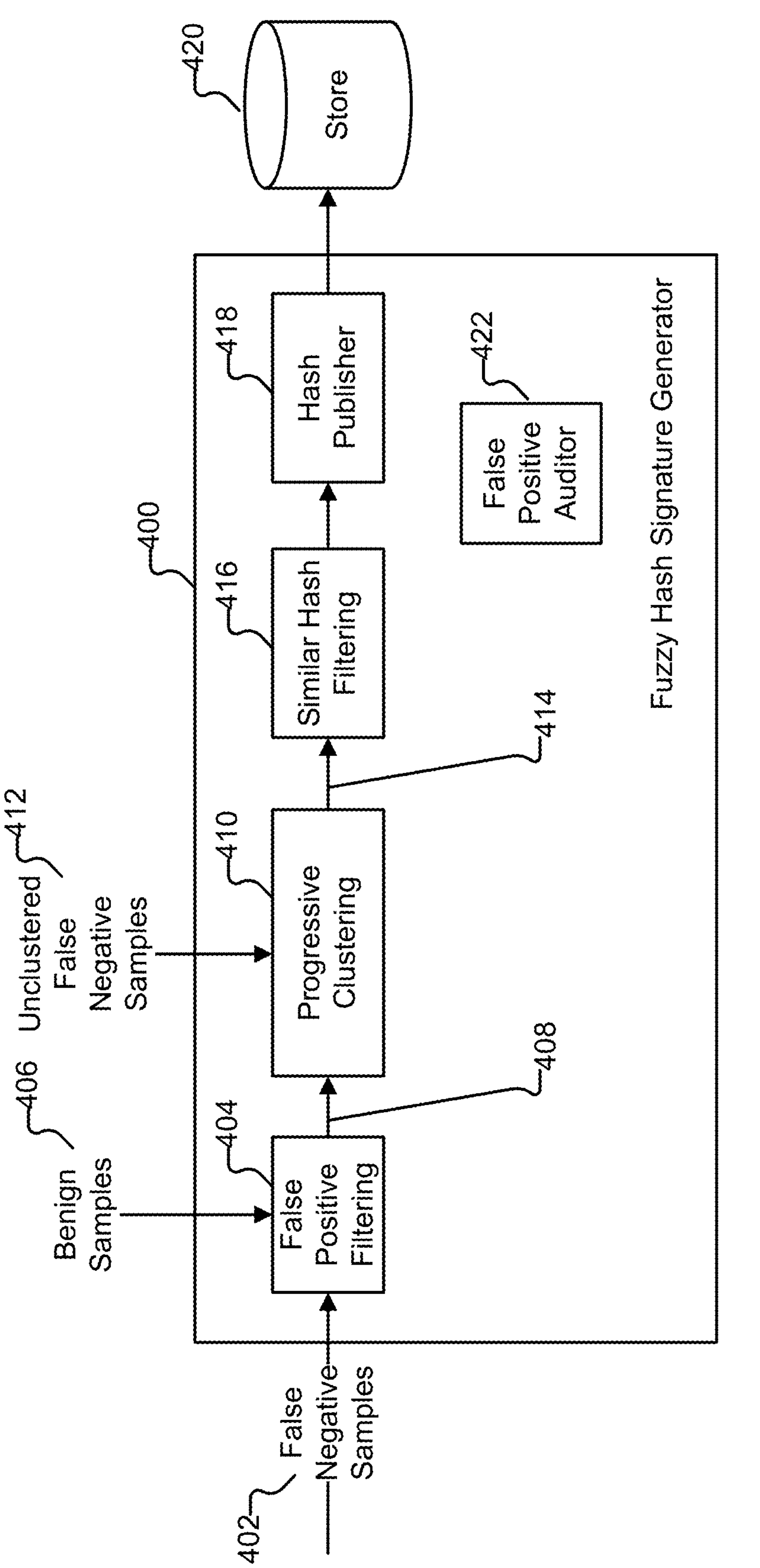
FIG. 4 illustrates an example of an embodiment of an automated fuzzy hash signature generator.

FIG. 4 illustrates an example of an embodiment of an automated fuzzy hash signature generator (400). Components of automated fuzzy hash signature generator 400 can be implemented in a variety of ways, including as a set of one or more scripts (e.g., written in Java, python, etc., as applicable).

After analysis (e.g., by an applicable static analysis engine 306 and/or dynamic analysis engine 310), a given sample (whether benign or malicious) has associated with it (e.g., stored in database 316) a verdict (e.g., benign or malicious). That verdict can be compared against one or more other data sources (e.g., ground truth data sources), such as VirusTotal, to determine whether the verdict is correct. Suppose a given sample is determined by security platform 122 to be malicious, but is determined by the other data source to be benign. This is an example of a false positive. Similarly, suppose a given sample is determined by security platform 122 to be benign, but is determined by the other data source to be malicious. This is an example of a false negative. Also as a result of analysis (e.g., by static analysis engine 306), security platform 122 has stored (e.g., in database 146) fuzzy hashes for a given sample (e.g., an ssdeep fuzzy hash). In the following discussion, "fuzzy hashes" and the samples for which they are generated are sometimes used interchangeably to aid in understanding.

Figure 5:
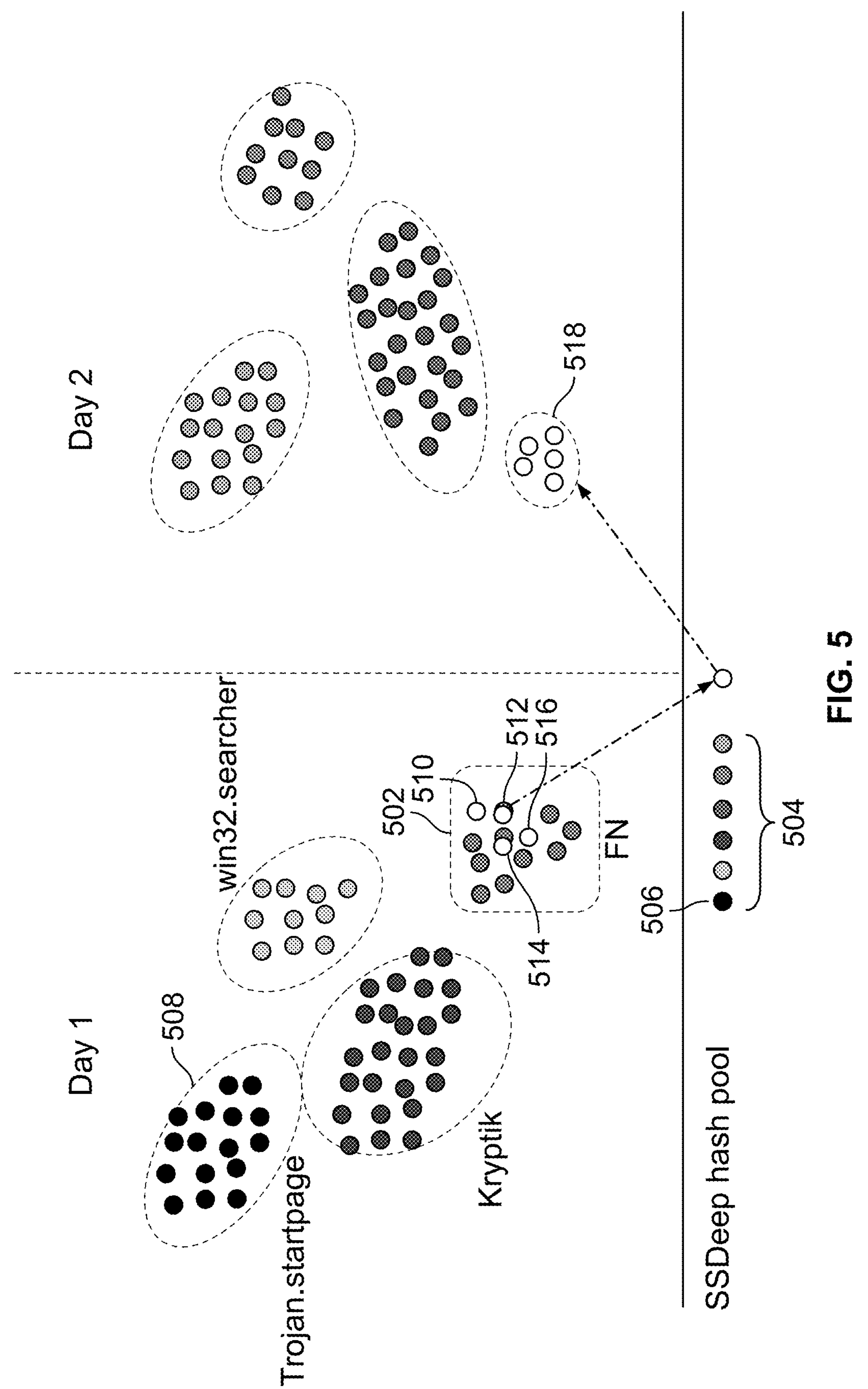
FIG. 5 illustrates an example of the clustering of malware samples across two days.

Automated fuzzy hash signature generator 400 takes, as initial input, a set of fuzzy hashes for a set of false negative samples 402. As mentioned above, security platform 122 can process a variety of different types of samples obtained from a variety of sources. Examples of types of such samples that can be processed by automated fuzzy hash signature generator 400 include portable executable (PE) files, executable and linkable (ELF) files, etc. An example of the set of false negative samples 402 is a set (e.g., obtained daily) of all newly seen (by security platform 122) samples determined to be falsely flagged as benign by security platform 122 (e.g., based on ground truth information provided by VirusTotal). An example way of obtaining the set of false negatives is for automated fuzzy hash signature generator 400 (or other appropriate system) to query database 146 for false negatives observed in the last day. A representation of an example of a set of false negative samples 402 is illustrated, collectively, in box 502 of FIG. 5. Also pictured in FIG. 5 are a set of existing ssdeep hash signatures (504) and various families of malware that correspond to hashes included in set 504. As one example, hash 506 can be used to identify members of the Trojan.startpage malware family (508).

False positive filter 404 performs pre-filtering on the received false negative samples 402 to determine whether any of the false negative samples could potentially cause false positives if deployed as signatures (e.g., for use by data appliance 102). As an example, use of "infections virus"-type malware in signature generation may result in an unacceptable amount of false positives if deployed and thus should be discarded from consideration. One approach to making this determination is to perform a pairwise comparison of fuzzy hashes of each of the false negative samples (402) to fuzzy hashes of each benign sample included in a set of benign samples (406) (e.g., using a fuzzy hash comparison tool, such as ssdeep.compare). If a match is found (e.g., a similarity score between a false negative sample and a benign sample is greater than 70), the false negative is discarded from further processing by automated fuzzy hash signature generator 400.

Surviving false negative samples 408 (e.g., those not filtered out for being too similar to known benign samples) are then provided to progressive clustering module 410 for clustering. In addition to the newly observed false negative samples (i.e., those of set 402 that survived filtering), progressive clustering module 410 also obtains a set of previously identified false negatives 412 (which also previously survived filtering) that were not previously clustered together by module 410. This allows for the detection of (and ability to generate signatures for) malware families that grow slowly. As an example, suppose that in the preceding 30 days, 1,000 false negative samples survived filtering by false positive filter 404, but were not clustered by progressive clustering module 410 (because they were too dissimilar from other samples). Progressive clustering module 410 will include those 1,000 samples along with the day's survivors of false positive filter 404 when attempting to find clusters of fuzzy hashes. In various embodiments, a retention policy is used to limit the growth of the unclustered false negative samples (e.g., only those false negatives initially encountered within the last 30 days are considered).

In the example shown in FIG. 5, suppose that samples 510-516 are clustered together by progressive clustering module 410. The remaining samples included in set 502 will be included in the set of unclustered false negative samples 412 in the future. One example way that progressive clustering module 410 can perform clustering is to perform a pairwise comparison of the fuzzy hashes of the samples included in sets 408 and 412 (e.g., using ssdeep.compare). If a threshold number of fuzzy hashes (e.g., five fuzzy hashes) match within a threshold similarity score (e.g., 70), they can be clustered together. For each cluster, a representative fuzzy hash (414) is selected by progressive clustering module 410 (e.g., at random, or by having the highest similarity scores with other members of the cluster) and provided to similar hash filtering module 416. Similar hash filtering module 416 compares (e.g., via a pairwise comparison or other applicable technique) the representative hashes 414 it receives from progressive clustering module 410 against existing representative hashes (e.g., stored in an indicator of compromise store 420 which can be implemented, for example, as a relational database). If the received representative hashes are sufficiently different from all existing hashes stored in store 420, they are added to store 420, otherwise they are discarded. In the example shown in FIG. 5, suppose sample 512 is selected by progressive clustering module 410 as a representative of the newly detected cluster comprising samples 510-516. Progressive clustering module 410 will provide fuzzy hash 512 to similar hash filter 416. If similar hash filter 416 determines that the fuzzy hash is sufficiently unique (i.e., does not match any other hashes inside store 420 within a threshold amount), it is published to store 420 by hash publisher 418 and can then be used (e.g., by data appliance 102) to detect instances of malware (e.g., detecting malware family members 518). Otherwise, the fuzzy hash is discarded. As applicable, in various embodiments, automated fuzzy hash signature generator 400 includes a false positive auditor 422. The false positive auditor is configured to determine whether, in production, any of the signatures generated by automated fuzzy hash signature generator 400 result in an excessive number of false positives. If so, they can be removed from store 420, disabled, modified, and/or flagged for review as applicable.

Figure 6:
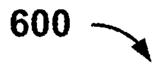
FIG. 6 illustrates an embodiment of a process for automatically generating fuzzy hash based signatures.
Figure 6:
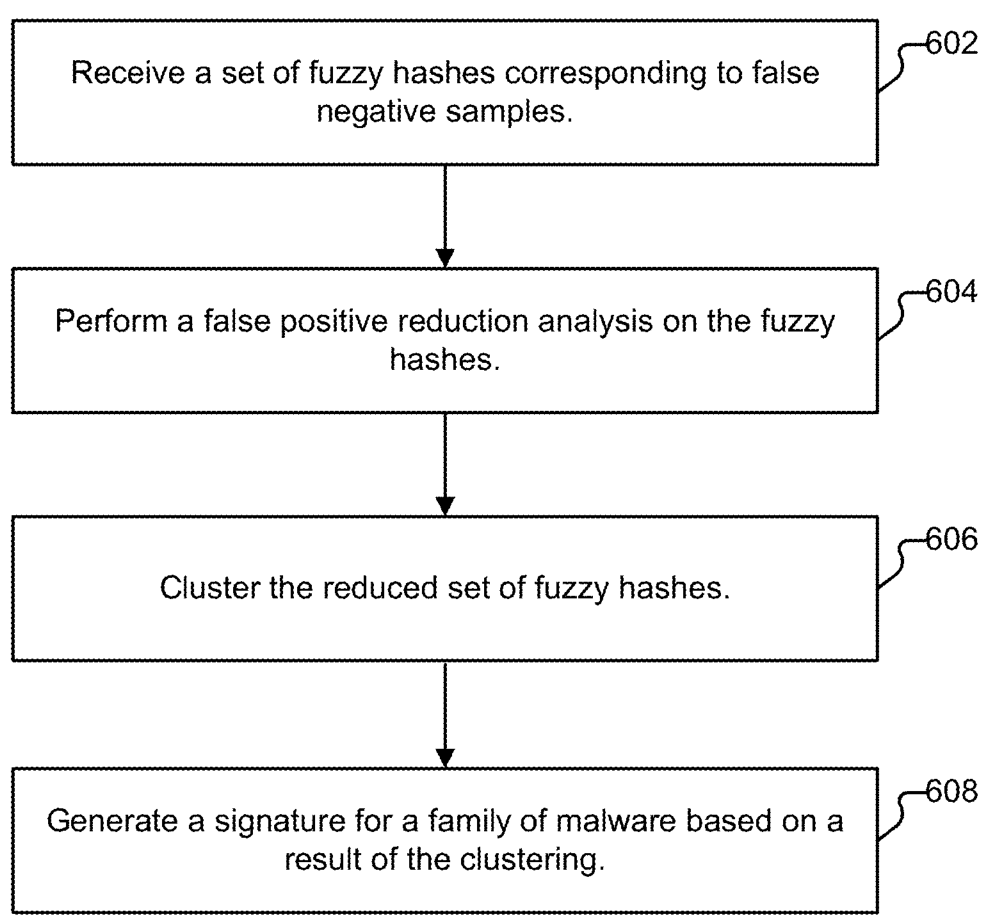

FIG. 6 illustrates an embodiment of a process for automatically generating fuzzy hash based signatures. In various embodiments, process 600 is performed by platform 122, and in particular by automated fuzzy hash signature generator 400. Process 600 begins at 602 when a set of fuzzy hashes corresponding to false negative samples is received. One way that automated fuzzy hash signature generator 400 can receive such hashes at 602 is to perform a query (e.g., of data stored in database 146, database 316, or another appropriate location) of fuzzy hashes of samples. At 604, a false positive reduction analysis is performed. One way of performing such an analysis is for false positive filter 404 to perform a pairwise comparison of each fuzzy hash received at 602 against a set of fuzzy hashes corresponding to benign samples. At 606, the filtered fuzzy hashes (e.g., the set of surviving fuzzy hashes 408) are clustered by progressive clustering module 410. Finally, at 608, a signature for a malware family is created as a result of the clustering. As one example, progressive clustering module 410 can select the fuzzy hash corresponding to sample 512 as a representative of a cluster comprising the fuzzy hashes of samples 510-516. The generated signature can be provided as output to a variety of locations. As one example, the fuzzy hash can be stored (e.g., in storage 142, database 146, or another appropriate location) by security platform 122 for various uses. One example use is for security platform 122 to include the signature along with other signatures that it provides to data appliances such as data appliances 102, 136, and 148. Such appliances can then use the provided signatures to help prevent malware from compromising nodes such as client 104 or otherwise causing harm to their respective networks 140, 114, and 116. The signature generation techniques described herein can be used for purposes other than malware detection. As one example, the techniques can be used to identify samples belonging to the same malware family for better understanding of the family.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising: a processor configured to: receive a set of candidate fuzzy hashes corresponding to a set of false negative samples; perform a false positive reduction analysis on the received set of candidate fuzzy hashes to generate a reduced set of fuzzy hashes; cluster, at least a portion of the reduced set of fuzzy hashes into a fuzzy hash cluster, wherein as part of the clustering a set of previously identified false negative samples is also evaluated; and generate a signature for a family of malware based at least in part on the fuzzy hash cluster; and a memory coupled to the processor and configured to provide the processor with instructions.

2. The system of claim 1, wherein the processor is further configured to filter out at least one fuzzy hash cluster based at least in part on a similarity match with an existing signature.

3. The system of claim 1, wherein performing the false positive reduction analysis includes performing a pairwise comparison between a candidate fuzzy hash included in the set of candidate fuzzy hashes and a fuzzy hash of a known benign sample.

4. The system of claim 1, wherein performing the false positive reduction analysis includes removing from consideration a fuzzy hash of a sample that is an infections virus.

5. The system of claim 1, wherein generating the signature includes selecting a representative fuzzy hash from the fuzzy hash cluster.

6. The system of claim 1, wherein generating the signature includes comparing the signature against a store of existing signatures.

7. The system of claim 1, wherein the generated signature is usable by a data appliance to determine whether a file is malicious.

8. The system of claim 1, wherein the processor is further configured to use the generated signature to detect a new malware family.

9. A method, comprising: receiving a set of candidate fuzzy hashes corresponding to a set of false negative samples; performing a false positive reduction analysis on the received set of candidate fuzzy hashes to generate a reduced set of fuzzy hashes; clustering, at least a portion of the reduced set of fuzzy hashes into a fuzzy hash cluster, wherein as part of the clustering a set of previously identified false negative samples is also evaluated; and generating a signature for a family of malware based at least in part on the fuzzy hash cluster.

10. A computer program product embodied in a non-transitory computer readable storage medium and comprising computer instructions for: receiving a set of candidate fuzzy hashes corresponding to a set of false negative samples; performing a false positive reduction analysis on the received set of candidate fuzzy hashes to generate a reduced set of fuzzy hashes; clustering, at least a portion of the reduced set of fuzzy hashes into a fuzzy hash cluster, wherein as part of the clustering a set of previously identified false negative samples is also evaluated; and generating a signature for a family of malware based at least in part on the fuzzy hash cluster.

11. The method of claim 9, further comprising filtering out at least one fuzzy hash cluster based at least in part on a similarity match with an existing signature.

12. The method of claim 9, wherein performing the false positive reduction analysis includes performing a pairwise comparison between a candidate fuzzy hash included in the set of candidate fuzzy hashes and a fuzzy hash of a known benign sample.

13. The method of claim 9, wherein performing the false positive reduction analysis includes removing from consideration a fuzzy hash of a sample that is an infections virus.

14. The method of claim 9, wherein generating the signature includes selecting a representative fuzzy hash from the fuzzy hash cluster.

15. The method of claim 9, wherein generating the signature includes comparing the signature against a store of existing signatures.

16. The method of claim 9, wherein the generated signature is usable by a data appliance to determine whether a file is malicious.

17. The method of claim 9, further comprising using the generated signature to detect a new malware family.

18. The computer program product of claim 10, further comprising instructions for filtering out at least one fuzzy hash cluster based at least in part on a similarity match with an existing signature.

19. The computer program product of claim 10, wherein performing the false positive reduction analysis includes performing a pairwise comparison between a candidate fuzzy hash included in the set of candidate fuzzy hashes and a fuzzy hash of a known benign sample.

20. The computer program product of claim 10, wherein performing the false positive reduction analysis includes removing from consideration a fuzzy hash of a sample that is an infections virus.

* * * * *